June 25, 1929.  M. EDWARDS  1,718,222

VALVE OPERATING MECHANISM

Filed May 18, 1927

INVENTOR
Moffat Edwards
BY Toulmin & Toulmin,
ATTORNEY

Patented June 25, 1929.

1,718,222

UNITED STATES PATENT OFFICE.

MOFFAT EDWARDS, OF OAK HILL, OHIO.

VALVE-OPERATING MECHANISM.

Application filed May 18, 1927. Serial No. 192,467.

My invention relates to valve operating mechanism.

It is the object of my invention to provide a valve operating mechanism in which the reciprocation of the piston rod will result in the proper positioning of valve mechanism.

It is the object of my invention to provide positive means for controlling the contents of a cylinder through suitable valves, dependent upon the position of the piston in the cylinder.

Referring to the drawings.

Figure 1:
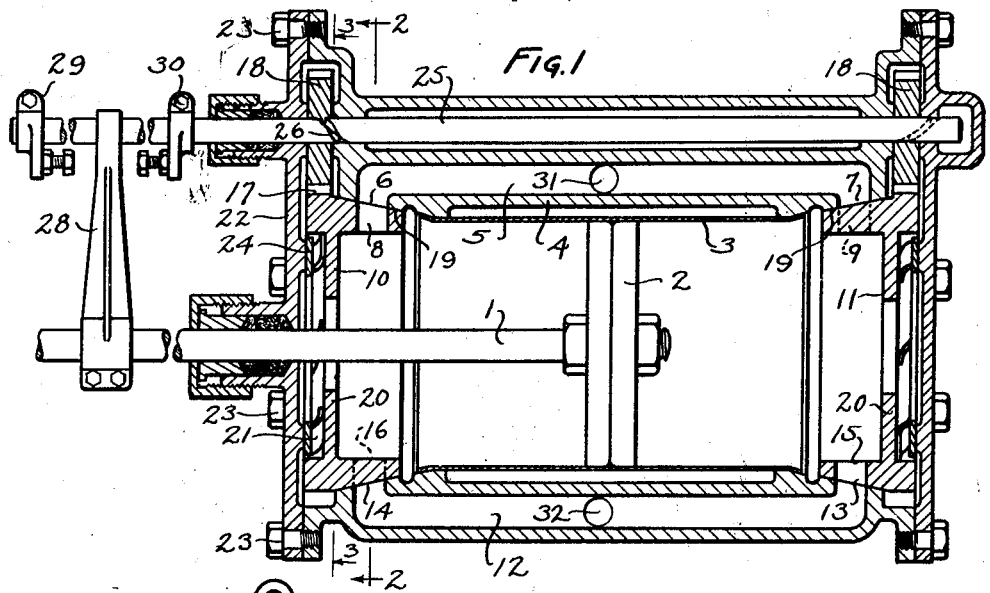
Figure 1 is a section through a cylinder valve and operating mechanism of my invention.
Figure 2:
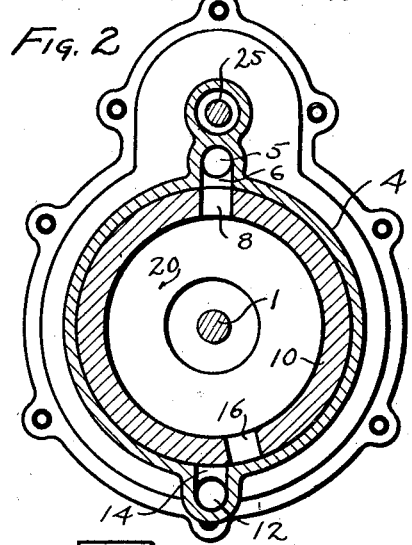
Figure 2 is a section on the line 2—2 of Figure 1, looking in the direction of the arrows.
Figure 3:
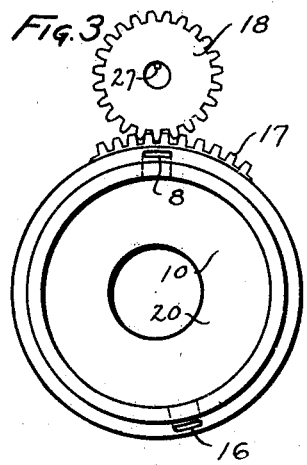
Figure 3 is an elevation of the gearing and left-hand valve mechanism shown in Figure 1, the point of view being that on the line 3—3 of Figure 1, looking in the direction of the arrows.
Figure 4:
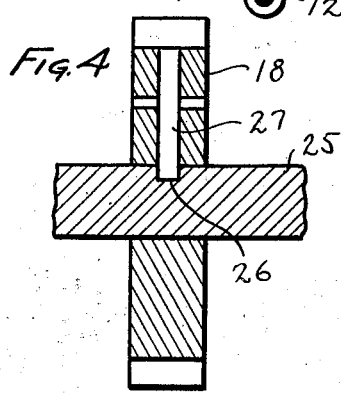
Figure 4 is a section through the valve shaft and valve gear.
Figure 5:
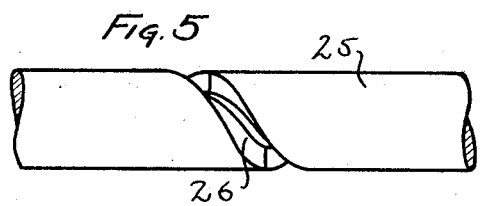
Figure 5 is a detail side elevation of the valve operating cam shaft, showing the cam groove.

Referring to the drawings in detail, 1 is a piston rod carrying a piston 2, operating in cylinder 3. The cylinder 3 is carried within a jacket having a wall 4 and a passageway in the wall, designated 5. This passageway communicates at either end with ports 6 and 7, which are adapted to register with ports 8 and 9 respectively, in rotary valve members 10 and 11.

A similar passageway 12 is provided on the other side of the cylinder, having ports 13 and 14 registering with ports 15 and 16 of the valve members 11 and 10 respectively. These valve members consist of a cylindrical body having an external gear 17 meshing with a valve gear 18. The cylindrical body is tapered as at 19 to fit against the tapered shoulders of the cylinder casing. An internally extending flange 20 is provided for positioning the cylindrical member and reenforcing it. The inward extending member 20 further serves as an abutment against which the spring fingers 21 press to maintain the tapered surface 19 in engagement with the tapered surface of the cylinder casing.

An end plate 22 is provided fastened to the cylinder casing by the bolts 23, which end plate serves to hold the springs 21 with their supporting ring 24 in position. At the same time the springs do not impede the rotation of this cylindrical valve member but permit its free rotation by the gear 18.

The gear 18 is loosely mounted upon a shaft 25, which reciprocates. This shaft is provided with a cam groove 26, in which a cam finger 27 of the gear 18 is located. As the gear is held from reciprocation by the end member 22 and the cylinder casing, the reciprocation of the shaft 25 will result in the rotation of the gear 18.

This reciprocation of the shaft 25 is brought about in the following manner: A cross arm 28 is clamped upon the piston rod 1. It extends adjacent to the shaft 25 between the abutments 29 and 30 clamped on that shaft. When the piston and piston rod are nearing the end of their stroke and it becomes desirable to cut off any further flow of fluid or gas by reason of the piston movement, then the arm 28 engages one of the stops 29 or 30 moving the shaft 25 in one direction, and in doing so the gear 18 is rotated which rotates the valve member 10 or the valve member 11, as the case may be, closing one of the valve member's ports and opening the other.

It will be understood that the passageway 5 is connected to one exit line, designated 31, while the passageway 12 is connected to an inlet line 32. It will be understood that the lines 31 and 32 may be used either for inlet or exit purposes.

Method of operation.

The numeral 31 represents the outlet port while 32 represents the intake port. In the position shown in Figure 1 the piston 2 is in the act of moving toward the lefthand end of the cylinder with the valves 6—8 and 13—15 open, while the valves 7—9 and 14—16 are closed.

In this position the fluid is being forced out through valve 6—8 while it is being taken in through the valve 13—15.

When the piston reaches the extreme lefthand limit of its motion the arm 28 will engage with the stop 29 to cause the rotation of the gear 18 with the consequent rotation of the valve members 10 and 11. After the valve members 10 and 11 are rotated thus the valves 6—8 and 13—15 are closed and the valves 7—9 and 14—16 are opened.

The piston then begins its righthand movement, forcing the liquid in the cylinder out through the valve 7—9 and out at the outlet port 31. At the same time the liquid is being drawn into the lefthand end of the cylinder through the intake port 32 and the valve 14—16. When the piston reaches the extreme righthand position in the cylinder the arm 28 contacts with the stop 30 to rotate the gears 18 to again shift the valve members 10 and 11 to their former position where the fluid is taken in through the port 32 through the valve 13—15 into the righthand end of the cylinder, while the liquid in the lefthand end of the cylinder is being forced out through valve 6—8 and the port 31.

Thus I have provided a suitable valve control mechanism, adaptable either to a single or double action pump or compressor, which will positively cut off the flow of fluid at a predetermined point in the stroke of the pump.

It will be understood that I desire to comprehend within my invention such modifications as will adapt it to varying conditions and uses.

Having thus fully described my invention, what I claim as new and desire to secure by Letters Patent, is:

1. In combination, a cylinder, a piston and piston rod, an inlet pipe and exit pipe, a valve member adapted to control the passage of fluid through said pipes, said valve member having a tapered body with ports therein for alternately registering with said pipes, yielding means to maintain said tapered body in engagement with the tapered seat in said cylinder and the tapered faces of said pipes, a fragmentary gear on said valve member, a head on said cylinder inclosing said valve member and maintaining said yielding member in position, a supplementary gear engaging with said fragmentary gear, a cam shaft having a cam groove, a cam pin on said supplementary gear engaging in the groove, space stops on said cam shaft and an arm on said piston rod extending to a point adjacent said stops to alternately engage them to reciprocate said cam shaft, whereby said valve member is rotated for the alternate opening and closing of said exit and inlet pipes.

2. In combination, a cylinder, a piston and piston rod, an inlet pipe and exit pipe, a valve member adapted to control the passage of fluid through said pipes, said valve member having a tapered body with ports therein for alternately registering with said pipes, yielding means to maintain said tapered body in engagement with the tapered seat in said cylinder and the tapered faces of said pipes, a fragmentary gear on said valve member, a head on said cylinder inclosing said valve member and maintaining said yielding member in position, a supplementary gear engaging with said fragmentary gear, a cam shaft having a cam groove, a cam pin on said supplementary gear engaging in the groove, space stops on said cam shaft, an arm on said piston rod extending to a point adjacent said stops to alternately engage them to reciprocate said cam shaft, whereby said valve member is rotated for the alternate opening and closing of said exit and inlet pipes, means of connecting said pipes to the other end of said cylinder and a second valve member, yielding seating means, cylinder head and supplementary gear mounted on said cam shaft whereby when one end of the cylinder is connected to the exit line the other end of the cylinder will be closed and connected to the inlet line.

3. In combination, a cylinder casing having inlet and exit passageways connected to inlet and exit lines, a cylinder, rotatable valve members having ports for controlling the communication with said passageways with respective ends of said cylinder so arranged that when one end of the cylinder is connected to the exit passageway the other end of the cylinder is connected to the inlet passageway, a piston and piston rod, means operated by said piston rod for controlling the operation of said valve members for opening and closing said ports, said means consisting of gearing on said valve members, cam gears engaging therewith, a common cam shaft supporting said gears, cam members on said gears, cam grooves and said cam shaft engaging therewith and space stops on said cam shaft for engaging an arm extending from said piston rod adjacent thereto for alternate engagement therewith and an arm on said piston rod.

In testimony whereof, I affix my signature.

MOFFAT EDWARDS.